(12) United States Patent
Desineni et al.

(10) Patent No.: US 10,152,488 B2
(45) Date of Patent: Dec. 11, 2018

(54) STATIC-ANALYSIS-ASSISTED DYNAMIC APPLICATION CRAWLING ARCHITECTURE

(71) Applicant: Samsung Electronics Co., Ltd., Suwon-si, Gyeonggi-do (KR)

(72) Inventors: Kalyan Desineni, Mountain View, CA (US); Manikandan Sankaranarasimhan, Fremont, CA (US); Vasanthakumar Sarpasayanam, Pondicherry (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 244 days.

(21) Appl. No.: 14/843,929

(22) Filed: Sep. 2, 2015

(65) Prior Publication Data

US 2016/0335348 A1 Nov. 17, 2016

Related U.S. Application Data

(60) Provisional application No. 62/193,051, filed on Jul. 15, 2015, provisional application No. 62/161,253, filed on May 13, 2015.

(51) Int. Cl.
*G06F 17/30* (2006.01)
*H04L 29/08* (2006.01)
*G06F 3/0484* (2013.01)

(52) U.S. Cl.
CPC .... *G06F 17/30156* (2013.01); *G06F 3/04842* (2013.01); *G06F 3/04847* (2013.01);
(Continued)

(58) Field of Classification Search
CPC combination set(s) only.
See application file for complete search history.

(56) References Cited

U.S. PATENT DOCUMENTS

| | | |
|---|---|---|
| 6,782,350 B1 | 8/2004 | Burnley et al. |
| 7,472,413 B1 | 12/2008 | Mowshowitz |
| (Continued) | | |

OTHER PUBLICATIONS

U.S. Appl. No. 14/849,540, filed Sep. 9, 2015, Kalyan Desineni.
(Continued)

*Primary Examiner* — Shyue Jiunn Hwa
(74) *Attorney, Agent, or Firm* — Jefferson IP Law, LLP

(57) ABSTRACT

A system for automated acquisition of content from an application includes a static analysis module. Using static analysis (analyzing code of the application independent of executing the code), the static analysis module identifies application state templates of the application and identifies user interface elements that, when actuated by a user, transition between states instantiated from different ones of the identified state templates. A graph creation module creates a graph data structure including nodes corresponding to the identified state templates and edges connecting the nodes. The edges are transitions corresponding to the identified user interface elements. A link extractor module executes the application and determines and records paths to states within the executing application according to the graph data structure. A scraper module, within an executing instance of the application, extracts text and metadata from states corresponding to endpoints of the recorded paths.

29 Claims, 11 Drawing Sheets

(52) U.S. Cl.
CPC .... *G06F 17/3053* (2013.01); *G06F 17/30489* (2013.01); *G06F 17/30563* (2013.01); *G06F 17/30864* (2013.01); *G06F 17/30867* (2013.01); *G06F 17/30873* (2013.01); *G06F 17/30882* (2013.01); *G06F 17/30958* (2013.01); *H04L 67/02* (2013.01)

(56) References Cited

U.S. PATENT DOCUMENTS

| | | | |
|---|---|---|---|
| 8,145,521 | B2 | 3/2012 | Sah et al. |
| 8,341,538 | B1 | 12/2012 | Antczak et al. |
| 8,489,573 | B2 | 7/2013 | Bain |
| 8,595,186 | B1 | 11/2013 | Mandyam et al. |
| 8,630,994 | B2 | 1/2014 | Greene |
| 8,694,496 | B2 | 4/2014 | Erickson |
| 9,177,058 | B2 | 11/2015 | Camelo et al. |
| 9,318,108 | B2 | 4/2016 | Gruber et al. |
| 9,747,191 | B1 | 8/2017 | Marolia et al. |
| 9,753,627 | B2 | 9/2017 | Chaudhri et al. |
| 9,811,250 | B2 | 11/2017 | Louch |
| 2005/0278728 | A1 | 12/2005 | Klementiev |
| 2006/0062426 | A1 | 3/2006 | Levy et al. |
| 2008/0134138 | A1* | 6/2008 | Chamieh .............. G06F 9/4428 717/105 |
| 2009/0013307 | A1* | 1/2009 | Raghavan ........... G06F 17/5009 717/106 |
| 2011/0314534 | A1 | 12/2011 | James |
| 2012/0054057 | A1 | 3/2012 | O'Connell et al. |
| 2012/0278793 | A1* | 11/2012 | Jalan .................... G06F 11/3419 717/158 |
| 2013/0346382 | A1 | 12/2013 | Varthakavi |
| 2014/0006129 | A1 | 1/2014 | Heath |
| 2015/0169772 | A1 | 6/2015 | Alonso et al. |
| 2016/0019206 | A1 | 1/2016 | Mysur et al. |
| 2016/0027045 | A1 | 1/2016 | Kurian et al. |
| 2016/0335286 | A1 | 11/2016 | Desineni et al. |
| 2016/0335333 | A1 | 11/2016 | Desineni et al. |
| 2016/0335349 | A1 | 11/2016 | Desineni et al. |
| 2016/0335356 | A1 | 11/2016 | Desineni et al. |
| 2017/0083606 | A1 | 3/2017 | Mohan |
| 2017/0185677 | A1 | 6/2017 | Anand et al. |
| 2017/0185679 | A1 | 6/2017 | Anand et al. |

OTHER PUBLICATIONS

U.S. Appl. No. 14/868,294, filed Sep. 28, 2015, Kalyan Desineni.
U.S. Appl. No. 14/869,127, filed Sep. 29, 2015, Kalyan Desineni.
U.S. Appl. No. 14/869,810, filed Sep. 29, 2015, Kalyan Desineni.
U.S. Appl. No. 14/982,192, filed Dec. 29, 2015, Saswat Anand.
U.S. Appl. No. 15/245,261, filed Aug. 24, 2016, Saswat Anand.
Hao, Shuai et al. "PUMA". Proceedings of the 12th annual international conference on Mobile systems, applications, and services—MobiSys 2014, 14 pages.
Lin, Felix et al. "SPADE: Scalable App Digging with Binary Instrumentation and Automated Execution," 2013, 12 pages.
Nath, Suman et al., "App Crawler: Opening Mobile App Black Boxes," 2012, 3 pages.

* cited by examiner

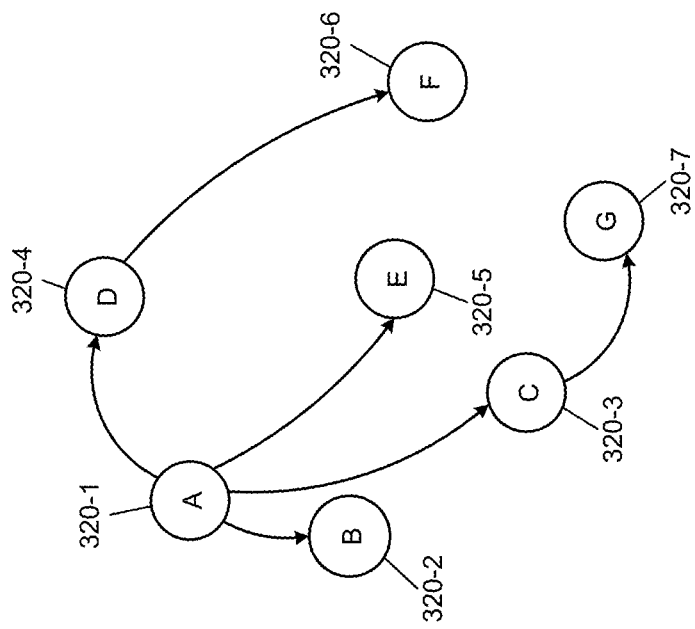
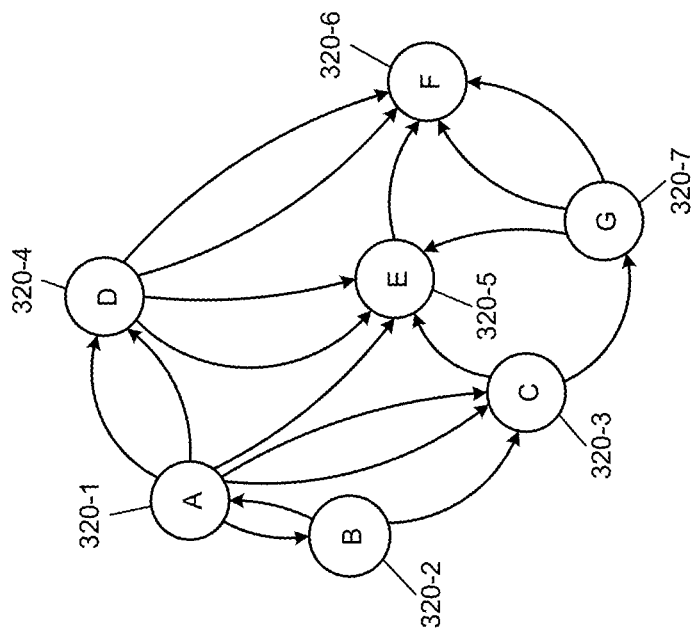
FIG. 5B
FIG. 5A

| State | Breadcrumb Trail |
|---|---|
| Starbucks Store #235 | Intent (Rest_Info Activity, ID for Starbucks #235) |
| Peet's Coffee and Tea | Intent (Rest_Info Activity, ID for Peet's) |
| Biggby | Intent (Rest_Info Activity, ID for Biggby) |
| Starbucks Store #235 More_Info | Intent (Rest_Info Activity, ID for Starbucks #235) –> UI Widget A ("More Info") click |
| Peet's Coffee and Tea More_Info | Intent (Rest_Info Activity, ID for Peet's) –> UI Widget A ("More Info") click |
| Biggby More_Info | Intent (Rest_Info Activity, ID for Biggby) –> UI Widget A ("More Info") click |
| Papa Romano's Pizza | Intent (Rest_Info Activity, ID for Papa Romano's) |
| Sushi Do | Intent (Rest_Info Activity, ID for Sushi Do) |
| Papa Romano's Pizza | Intent (Rest_Info Activity, ID for Papa Romano's) –> UI Widget A ("More Info") click |
| Sushi Do | Intent (Rest_Info Activity, ID for Sushi Do) –> UI Widget A ("More Info") click |

FIG. 11

STATIC-ANALYSIS-ASSISTED DYNAMIC APPLICATION CRAWLING ARCHITECTURE

CROSS-REFERENCE TO RELATED APPLICATIONS

This application claims the benefit of U.S. Provisional Application No. 62/161,253, filed on May 13, 2015, and U.S. Provisional Application No. 62/193,051, filed on Jul. 15, 2015. The entire disclosures of the applications referenced above are incorporated herein by reference.

FIELD

The present disclosure relates to crawling applications for content, and more particularly to crawling mobile applications for content.

BACKGROUND

Search engines are an integral part of today's world. A key component of a search engine is the collection of search indices that power the search. In the context of a search engine, a search index can be an inverted index that associates keywords or combinations of keywords to documents (e.g., web pages) that contain the keyword or combination of keywords. In order to generate and maintain these search indexes, most search engines use crawlers to identify documents and information within the documents. A traditional crawler requests a document from a content provider and the content provider provides the requested document to the crawler. The crawler then identifies and indexes the keywords and combinations of keywords in the document.

As the world transitions to a mobile-based architecture, the way content providers provide access to their content is changing. User devices can access content using a variety of different mechanisms. For example, user devices can obtain content from a content provider using a native application dedicated to accessing a software application of the content provider or a web browser that accesses the software application using a web browser. Furthermore, content providers may allow access to different content depending on the geographic region of a user device, the type of user device, the time of day, and/or the operating system of the user device. For these and other reasons, crawling has become an increasingly difficult task.

SUMMARY

A system for automated acquisition of content from an application includes a static analysis module. Using static analysis (analyzing code of the application independent of executing the code), the static analysis module identifies application state templates of the application and identifies user interface elements that, when actuated by a user, are configured to transition between states instantiated from different ones of the identified application state templates. The system includes a graph creation module configured to create a graph data structure including nodes and edges connecting the nodes. The nodes correspond to the identified application state templates. The edges correspond to transitions between the identified application state templates corresponding to the identified user interface elements. The system includes a link extractor module configured to execute the application and determine and record paths to application states within the executing application according to the graph data structure. The system includes a scraper module configured to, within an executing instance of the application, extract text and metadata from application states corresponding to endpoints of the recorded paths. Information based on the extracted text and metadata is stored in a data store.

In other features, the system includes a graph optimization module configured to create an optimized graph data structure by (i) removing cycles from the graph data structure and (ii) removing redundant edges from the graph data structure. The link extractor module operates according to the optimized graph data structure. In other features, the graph data structure includes a head node corresponding to a default application state template of the application and wherein, upon execution, the application presents a state instantiated from the default application state template.

In other features, the edges are directed and each have a starting node and an ending node. The starting node corresponds to an application state template having a user interface event configured to cause a transition to the ending node. None of the edges have the head node as the ending node. In other features, the graph optimization module is configured to create the optimized graph data structure such that each of the nodes of the graph data structure is present in the optimized graph data structure. The optimized graph data structure retains edges from the graph data structure required for, for each node of the nodes that is not the head node, a shortest path from the head node to the node. The optimized graph data structure omits edges not required for the shortest paths.

In other features, the link extractor module is configured to, for each path defined by the graph data structure, follow the path within the executing application and add application states reachable from an endpoint of the path to an application state list. In other features, the link extractor module is configured to, for each path defined by the graph data structure, add application states reachable from intermediate states along the path to the application state list. In other features, the link extractor module is configured to, for each application state in the application state list, record a series of user interface events used to reach the application state.

In other features, the scraper module is configured to, for each application state in the application state list, (i) reach the application state by replaying the recorded series of user interface events to the executing application and (ii) extract text and metadata from the application state. In other features, the system includes a guide update module configured to generate an updated graph data structure based on the graph data structure in response to real-time data from the link extractor module. The link extractor module is configured to operate based on the updated graph data structure.

In other features, the guide update module is configured to generate the updated graph data structure by, in response to a direct programming call being available to reach a first node of the nodes, creating a new edge directly from a head node of the nodes to the first node. In other features, the link extractor module is configured to execute the application within an emulator. In other features, the scraper module is configured to execute the instance of the application within a second emulator.

In other features, a search system includes the system and the data store. A set generation module is configured to, in response to a query from a user device, select records from the data store to form a consideration set of records. A set processing module is configured to assign a score to each record of the consideration set of records. A results generation module is configured to respond to the user device with a subset of the consideration set of records. The subset is selected based on the assigned scores.

A method of automated acquisition of content from an application includes, using static analysis (analyzing code of the application independent of executing the code), identifying application state templates of the application. The method includes, using static analysis, identifying user interface elements that, when actuated by a user, are configured to transition between states instantiated from different ones of the identified application state templates. The method includes creating a graph data structure including nodes and edges connecting the nodes. The nodes correspond to the identified application state templates. The edges correspond to transitions between the identified application state templates corresponding to the identified user interface elements. The method includes executing the application. The method includes determining and recording paths to application states within the executing application according to the graph data structure. The method includes, within an executing instance of the application, extracting text and metadata from application states corresponding to endpoints of the recorded paths. The method includes storing information based on the extracted text and metadata in a data store.

In other features, the method includes creating an optimized graph data structure by (i) removing cycles from the graph data structure and (ii) removing redundant edges from the graph data structure. Determining and recording is performed according to the optimized graph data structure. In other features, the graph data structure includes a head node corresponding to a default application state template of the application and wherein, upon execution, the application presents a state instantiated from the default application state template.

In other features, the edges are directed and each have a starting node and an ending node. The starting node corresponds to an application state template having a user interface event configured to cause a transition to the ending node. None of the edges have the head node as the ending node. In other features, each of the nodes of the graph data structure is present in the optimized graph data structure. The optimized graph data structure retains edges from the graph data structure required for, for each node of the nodes that is not the head node, a shortest path from the head node to the node. The optimized graph data structure omits edges not required for the shortest paths.

In other features, the emulator and the second emulator are separate instances of an emulated operating system. In other features, the determining and recording paths includes, for each path defined by the graph data structure, following the path within the executing application and adding application states reachable from an endpoint of the path to an application state list. In other features, the determining and recording paths includes, for each path defined by the graph data structure, adding application states reachable from intermediate states along the path to the application state list.

In other features, the determining and recording paths includes, for each application state in the application state list, recording a series of user interface events used to reach the application state. In other features, the method includes, for each application state in the application state list, reaching the application state by replaying the recorded series of user interface events to the executing application. The text and metadata are extracted from the application state.

In other features, the method includes generating an updated graph data structure based on the graph data structure in response to real-time data from the executing application. The determining and recording paths is performed based on the updated graph data structure. In other features, the generating the updated graph data structure includes, in response to a direct programming call being available to reach a first node of the nodes, creating a new edge directly from a head node of the nodes to the first node. In other features, the executing the application is performed within a first emulator. In other features, the extracting text and metadata is performed within a second emulator executing the application.

A method of operating a mobile application search system includes the above method. The method further includes, in response to receiving a query from a user device, selecting records from the data store to form a consideration set of records. The method further includes assigning a score to each record of the consideration set of records. The method further includes responding to the user device with a subset of the consideration set of records. The subset is selected based on the assigned scores.

In other features, a non-transitory computer-readable medium stores processor-executable instructions configured to perform any of the above methods.

BRIEF DESCRIPTION OF THE DRAWINGS

The present disclosure will become more fully understood from the detailed description and the accompanying drawings.

FIG. 5A is an illustration of an initial graph structure based on static analysis.

FIG. 5B is an illustration of an optimized version of the graph structure of FIG. 5A.

FIG. 11 is an illustration of an example state list generated by static-analysis-assisted dynamic analysis.

In the drawings, reference numbers may be reused to identify similar and/or identical elements.

DETAILED DESCRIPTION

Example User Interface

Figure 1:
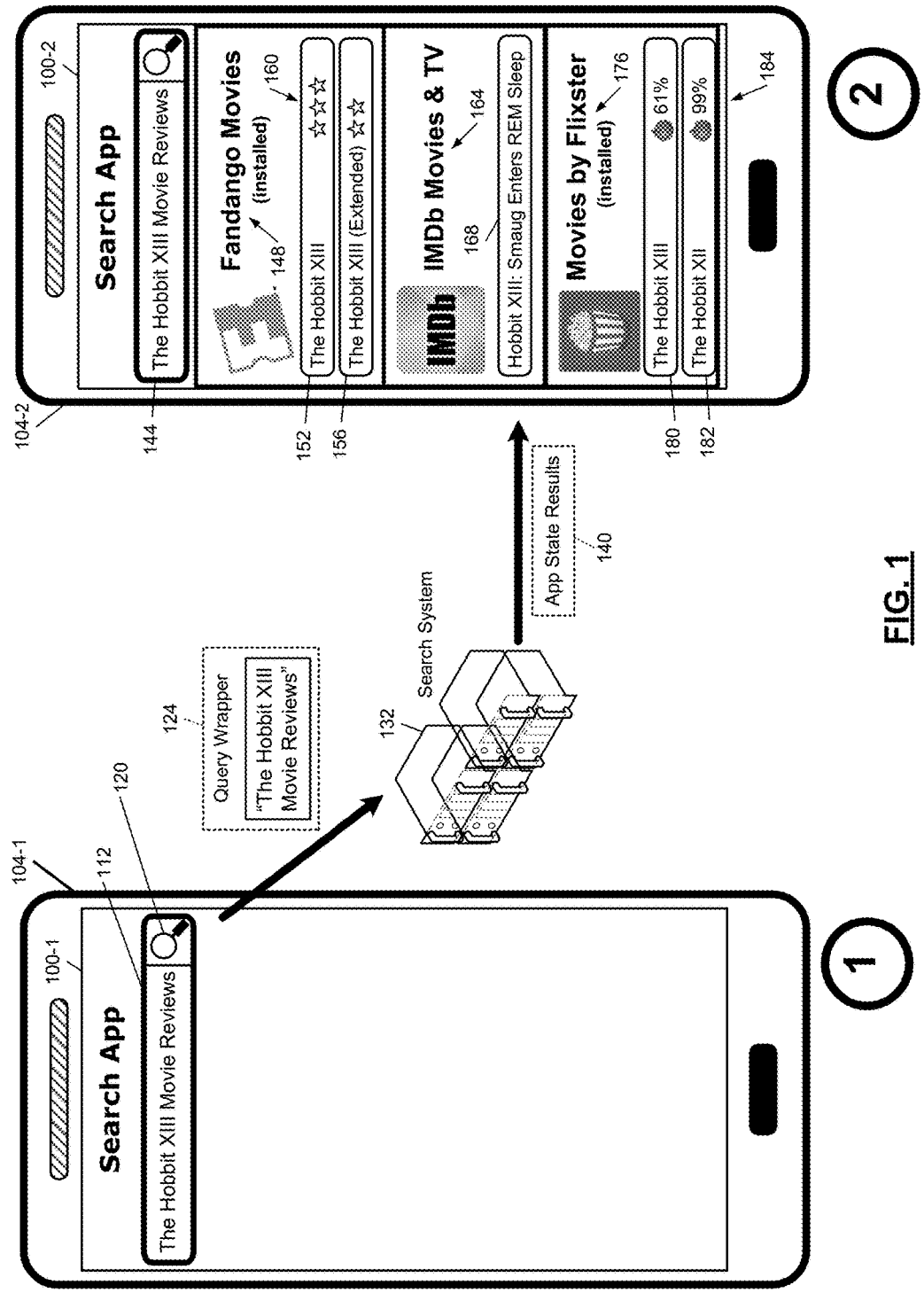
FIG. 1 is a combined functional block diagram and graphical user interface example according to the principles of the present disclosure.

In FIG. 1, an unsophisticated Search App 100 is shown running on a user device, such as smartphone 104. A first state of the Search App 100 is shown at 100-1, and the corresponding reference numeral for the smartphone 104 is 104-1. In the simple interface of the Search App 100-1, a search bar 112 allows a user to perform a search—in this case, for reviews of a (thankfully) fictional movie "The Hobbit XIII."

When a user of the Search App 100 selects (such as by tapping their finger on) a button 120 (having a magnifying glass icon), a query wrapper 124 is sent to a search system 132. Example contents of the query wrapper 124 may include a text query, such as "The Hobbit XIII Movie Reviews." Note that the text in the query wrapper 124 includes not just the function (movie reviews) but also an indication of an entity ("The Hobbit XIII") that is the target of the function. This indicates the user's intent that not only should a movie review app be shown, but preferably a state of the movie review app that directly provides reviews of The Hobbit XIII.

The search system 132, as described in more detail below, identifies relevant apps and app states based on the query wrapper 124. For example, relevant app states will generally include apps that have movie review functionality and that include a state with movie reviews of the identified entity ("The Hobbit XIII"). The search system 132 returns app state results 140 to the smartphone 104, and example contents of the app state results 140 are described in more detail below.

A graphical presentation of the app state results 140 is displayed in a state 100-2 of the Search App 100, and the corresponding reference numeral for the smartphone 104 showing the state 100-2 is 104-2. The graphical results may be displayed in a portion of the Search App 100. In various implementations, the results may slide in from one side or from the top or bottom, suggesting to the user that the results can be dismissed by swiping in an opposite direction. The search string that yielded the results may be presented to the user, such as in a textbox 144. The textbox 144 may allow the user to revise the search string in order to perform additional searches.

Each graphical result of the app state results 140 may include a header (or, title), such as the header "Fandango Movies" at 148. The header may be the same as a title of an app, and may also indicate whether the app is installed. As shown in FIG. 1 with an "installed" parenthetical, "Fandango Movies" is already installed on the smartphone 104. Other text, such as "Open," may similarly indicate that the app is already installed. Apps not yet installed may be indicated with "Download" or "Install" labels. Equivalently, icons or other visual cues may distinguish between apps that can simply be opened (including native apps and, as described in more detail below, web apps) or first need to be installed.

Two specific states are displayed with respect to the "Fandango Movies" app: "The Hobbit XIII" at 152 and "The Hobbit XIII (Extended)" at 156. This text may be the title text of the corresponding state in the "Fandango Movies" app. Additional data associated with each of these states may be shown. For example, the search system 132 may indicate that "The Hobbit XIII" state of the "Fandango Movies" app includes a 3-star rating. This 3-star rating may be shown at 160. Other data may include snippets of text (such as the first few words of a review), an image (such as a screenshot of the state), a reliability metric (such as number of user reviews), a freshness metric (such as most recent observed update to the state), etc.

These specific states may include user-selectable links directly to the corresponding entries in the "Fandango Movies" app. In other words, in response to user selection (such as by tapping the area of the screen associated with "The Hobbit XIII" 152), the Search App 100 will open the "Fandango Movies" app to the state where movie reviews are shown for "The Hobbit XIII." As described in more detail below, this direct action may be accomplished by passing an identifier of the "The Hobbit XIII" state as a parameter to the "Fandango Movies" app or by executing a script that navigates to the state for the "The Hobbit XIII" from another state of the "Fandango Movies" app.

If the user selects an area of the graphical results in the Search App 100 that is associated with the "Fandango Movies" app, but not with one of the specific states 152 or 156, the Search App 100 may open the "Fandango Movies" app to a default state. In other implementations, selecting an area not associated with one of the specific states 152 or 156 will result in no action.

A deep view card for an application or a state of an application shows additional information, not just the identification of the application or application state. For example, the information may include a title of the application state or a description of the application state, which may be a snippet of text from the application state. Other metadata may be provided from the application state, including images, location, number of reviews, average review, and status indicators. For example, a status indicator of "open now" or "closed" may be applied to a business depending on whether the current time is within the operating hours of the business.

Some deep view cards may emphasize information that led to the deep view card being selected as a search result. For example, text within the deep view card that matches a user's query may be shown in bold or italics. The deep view card may also incorporate elements that allow direct actions, such as the ability to immediately call an establishment or to transition directly to a mapping application to get navigation directions to the establishment. Other interactions with the deep view card (such as tapping or clicking any other area of the deep view card) may take the user to the indicated state or application. As described in more detail below, this may be accomplished by opening the relevant app or, if the app is not installed, opening a website related to the desired application state. In other implementations, an app that is not installed may be downloaded, installed, and then executed in order to reach the desired application state.

In other words, a deep view card includes an indication of the application or state as well as additional content from the application or state itself. The additional content allows the user to make a more informed choice about which result to choose, and may even allow the user to directly perform an action without having to navigate to the application state. If the action the user wants to take is to obtain information, in some circumstances the deep view card itself may provide the necessary information.

A deep view is presented for "IMDb Movies & TV" at 164. A user-selectable link 168 is shown for a state of the "IMDb Movies & TV" app titled "The Hobbit XIII: Smaug Enters REM Sleep." The "IMDb Movies & TV" app is not shown with an "installed" parenthetical, indicating that download and installation must first be performed.

Selecting the user-selectable link 168 may therefore trigger the opening of a digital distribution platform in either a web browser or a dedicated app, such as the app for the GOOGLE PLAY STORE digital distribution platform. The identity of the app to be downloaded (in this case, the IMDb app) is provided to the digital distribution platform so that the user is immediately presented with the ability to download the desired app. In some implementations, the download may begin immediately, and the user may be given the choice of approving installation. Upon completion of installation, control may automatically navigate to the desired state of the "IMDb Movies & TV" app—that is, the state for "The Hobbit XIII: Smaug Enters REM Sleep".

A "Movies by Flixster" app title is shown at 176, and is associated with a user-selectable link 180 for a state titled "The Hobbit XIII" and a user-selectable link 182 for a state titled "The Hobbit XII." The user-selectable link 180 includes additional data associated with the state for "The Hobbit XIII." Specifically, graphical and numerical representations of critics' reviews of the movies "The Hobbit XIII" and "The Hobbit XII" are depicted at 184.

Search Module

Figure 2:
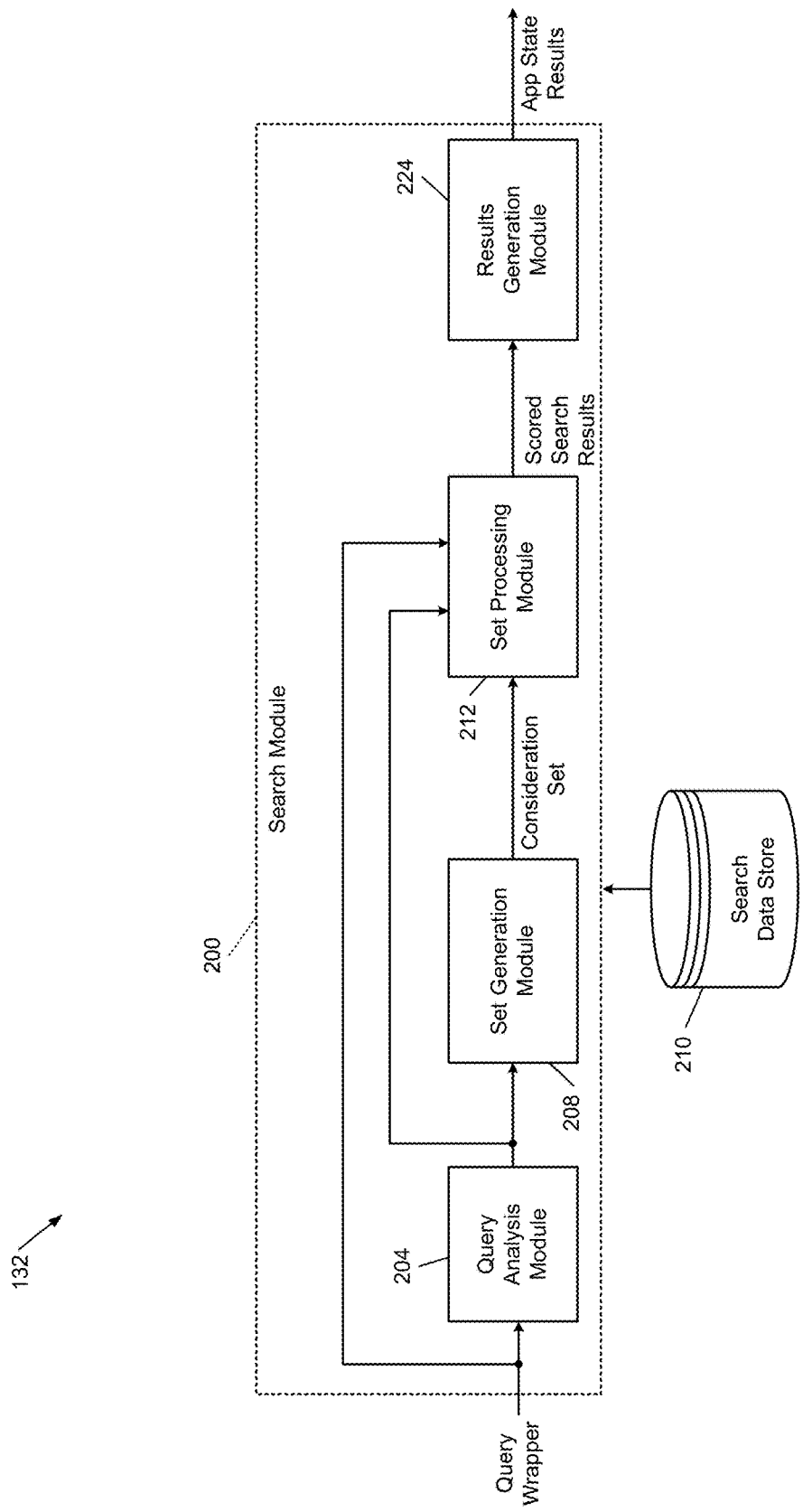
FIG. 2 is a functional block diagram of an example implementation of the search system of FIG. 1.

In FIG. 2, an example implementation of the search system 132 includes a search module 200. The search module 200 includes a query analysis module 204 that receives a query wrapper, such as the query wrapper 124 of FIG. 1. The query analysis module 204 analyzes the text query from the query wrapper. For example, the query analysis module 204 may tokenize the query text, filter the query text, and perform word stemming, synonymization, and stop word removal. The query analysis module 204 may also analyze additional data stored within the query wrapper. The query analysis module 204 provides the tokenized query to a set generation module 208.

The set generation module 208 identifies a consideration set of application state records from a search data store 210 based on the query tokens. Application (equivalently, app) state records are described in more detail in FIG. 3A and FIG. 3B. In various implementations, the search data store 210 may also include app records. In various implementations, an app record may be stored as an app state record that simply has a predetermined value, such as null, for the specific state of the app.

App state records in the search data store 210 may be generated by crawling and scraping apps according to the principles of the present disclosure. Some or all of the contents of the records of the search data store 210 may be indexed in inverted indices. In some implementations, the set generation module 208 uses the APACHE LUCENE software library by the Apache Software Foundation to identify records from the inverted indices. The set generation module 208 may search the inverted indices to identify records containing one or more query tokens. As the set generation module 208 identifies matching records, the set generation module 208 can include the unique ID of each identified record in the consideration set. For example, the set generation module 208 may compare query terms to an app state name and app attributes (such as a text description and user reviews) of an app state record.

Further, in some implementations, the set generation module 208 may determine an initial score of the record with respect to the search query. The initial score may indicate how well the contents of the record matched the query. For example, the initial score may be a function of term frequency-inverse document frequency (TF-IDF) values of the respective query terms.

A set processing module 212 receives unique IDs of app state records identified by the set generation module 208 and determines a result score for some or all of the IDs. A result score indicates the relevance of an app state with respect to the tokenized query and context parameters. In various implementations, a higher score indicates a greater perceived relevance.

For example, other items in the query wrapper may act as context parameters. Geolocation data may limit the score of (or simply remove altogether) apps that are not pertinent to the location of the user device. A blacklist in the query wrapper may cause the set processing module 212 to remove app records and/or app state records from the consideration set that match the criteria in the blacklist, or to set their score to a null value, such as zero.

The set processing module 212 may generate a result score based on one or more scoring features, such as record scoring features, query scoring features, and record-query scoring features. Example record scoring features may be based on measurements associated with the record, such as how often the record is retrieved during searches and how often links generated based on the record are selected by a user. Query scoring features may include, but are not limited to, the number of words in the search query, the popularity of the search query, and the expected frequency of the words in the search query. Record-query scoring features may include parameters that indicate how well the terms of the search query match the terms of the record indicated by the corresponding ID.

The set processing module 212 may include one or more machine-learned models (such as a supervised learning model) configured to receive one or more scoring features. The one or more machine-learned models may generate result scores based on at least one of the record scoring features, the query scoring features, and the record-query scoring features.

For example, the set processing module 212 may pair the search query with each app state ID and calculate a vector of features for each {query, ID} pair. The vector of features may include one or more record scoring features, one or more query scoring features, and one or more record-query scoring features. In some implementations, the set processing module 212 normalizes the scoring features in the feature vector. The set processing module 212 can set non-pertinent features to a null value or zero.

The set processing module 212 may then input the feature vector for one of the app state IDs into a machine-learned regression model to calculate a result score for the ID. In some examples, the machine-learned regression model may include a set of decision trees (such as gradient-boosted decision trees). Additionally or alternatively, the machine-learned regression model may include a logistic probability formula. In some implementations, the machine-learned task can be framed as a semi-supervised learning task, where a minority of the training data is labeled with human-curated scores and the rest are used without human labels.

The machine-learned model outputs a result score of the ID. The set processing module 212 can calculate result scores for each of the IDs that the set processing module 212 receives. The set processing module 212 associates the result scores with the respective IDs and outputs the most relevant scored IDs.

A results generation module 224 may choose specific access mechanisms from the application records and app state records chosen by the set processing module 212. The results generation module 224 then prepares a results set to return to the user device. Although called "app state results" here, some of the access mechanisms may correspond to a default state (such as a home page) of an app—these may be a special case of an app state record or may be an app record.

The results generation module 224 may select an access mechanism for an app state record based on whether the app is installed on the device. If the app is installed, an access mechanism that opens the app directly to the specified state is selected. Meanwhile, if the app is not installed, a selected access mechanism first downloads and installs the app, such as via a script, before opening the app to the specified state. Opening the app to the specified state may include a single command or data structure (such as an intent in the ANDROID operating system) that directly actuates the specified state. For other apps, a script or other sequence may be used to open the app to a certain state (such as a home, or default, state) and then navigate to the specified state.

The results generation module 224 may generate or modify access mechanisms based on the operating system identity and version for the user device to which the results are being transmitted. For example, a script to download, install, open, and navigate to a designated state may be fully formed for a specific operating system by the results generation module 224.

If the results generation module 224 determines that none of the native access mechanisms are likely to be compatible with the user device, the search module 200 may send a web access mechanism to the user device. If no web access mechanism is available, or would be incompatible with the user device for some reason (for example, if the web access mechanism relies on the JAVA programming language, which is not installed on the user device), the results generation module 224 may omit the result.

App State Records

Figure 3:
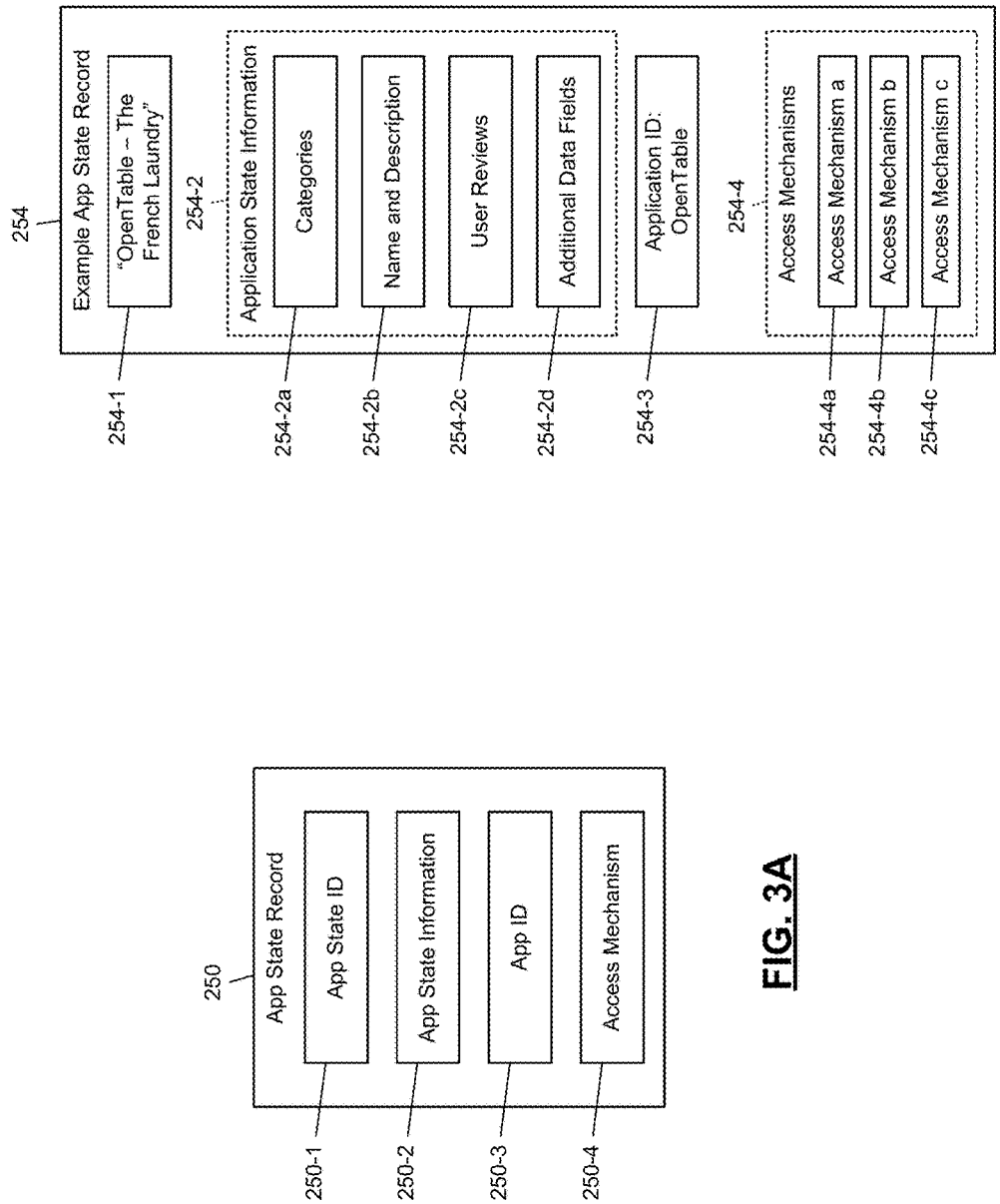
FIG. 3A is a graphical representation of an example application state record format.
FIG. 3B is a graphical representation of an example application state record according to the format of FIG. 3A.

In FIG. 3A, an example format of an app state record 250 includes an app state identifier (ID) 250-1, app state information 250-2, an app identifier (ID) 250-3, and one or more access mechanisms 250-4. The app state ID 250-1 may be used to uniquely identify the app state record 250 in the search data store 210. The app state ID 250-1 may be a string of alphabetic, numeric, and/or special (e.g., punctuation marks) characters that uniquely identifies the associated app state record 250. In some examples, the app state ID 250-1 describes the application state in a human-readable form. For example, the app state ID 250-1 may include the name of the application referenced in the access mechanisms 250-4.

In a specific example, an app state ID 250-1 for an Internet music player application may include the name of the Internet music player application along with the song name that will be played when the Internet music player application is set into the specified state. In some examples, the app state ID 250-1 is a string formatted similarly to a uniform resource locator (URL), which may include an identifier for the application and an identifier of the state within the application. In other implementations, a URL used as the app state ID 250-1 may include an identifier for the application, an identifier of an action to be provided by the application, and an identifier of an entity that is the target of the action.

For example only, see FIG. 3B, which shows an example app state record 254 associated with the OPENTABLE application from OpenTable, Inc. The OPENTABLE application is a restaurant-reservation application that allows users to search for restaurants, read reviews, and make restaurant reservations. The example app state record 254 of FIG. 3B describes an application state of the OPENTABLE application in which the OPENTABLE application accesses information for THE FRENCH LAUNDRY restaurant, a Yountville, Calif. restaurant. An app state ID 254-1 for the example app state record 254 is shown as "OpenTable—The French Laundry."

Another implementation of the displayed app state ID 254-1 is based on a triplet of information: {application, action, entity}. The triplet for the app state record 254 may be {"OpenTable", "Show Reviews", "The French Laundry"}. As mentioned above, this triplet may be formatted as a URL, such as the following: "func://www.OpenTable.com/Show_Reviews/The_French_Laundry". Note that a different namespace is used ("func://") to differentiate from the standard web namespace ("http://"), as the URL-formatted ID may not resolve to an actual web page. For example only, the OpenTable website may use a numeric identifier for each restaurant in their web URLs instead of the human-readable "The_French_Laundry."

Continuing with FIG. 3A, the app state information 250-2 may include data that describes an app state into which an application is set according to the access mechanisms 250-4. The types of data included in the app state information 250-2 may depend on the type of information associated with the app state and the functionality specified by the access mechanisms 250-4. The app state information 250-2 may include a variety of different types of data, such as structured, semi-structured, and/or unstructured data. The app state information 250-2 may be automatically and/or manually generated and updated based on documents retrieved from various data sources, which may include crawling of the apps themselves.

In some examples, the app state information 250-2 includes data presented to a user by an application when in the app state corresponding to the app state record 250. For example, if the app state record 250 is associated with a shopping application, the app state information 250-2 may include data that describes products (such as names and prices) that are shown in the app state corresponding to the app state record 250. As another example, if the app state record 250 is associated with a music player application, the app state information 250-2 may include data that describes a song (such as by track name and artist) that is played or displayed when the music player application is set to the specified app state.

When the app state record 250 corresponds to a default state of an application, the app state information 250-2 may include information generally relevant to the application and not to any particular app state. For example, the app state information 250-2 may include the name of the developer of the application, the publisher of the application, a category (e.g., genre) of the application, a text description of the application (which may be specified by the application's developer), and the price of the application. The app state information 250-2 may also include security or privacy data about the application, battery usage of the application, and bandwidth usage of the application. The app state information 250-2 may also include application statistics, such as number of downloads, download rate (for example, average downloads per month), download velocity (for example, number of downloads within the past month as a percentage of total downloads), number of ratings, and number of reviews.

In FIG. 3B, the example app state record 254 includes app state information 254-2, including a restaurant category field 254-2a of THE FRENCH LAUNDRY restaurant, a name and text description field 254-2b of THE FRENCH LAUNDRY restaurant, user reviews field 254-2c of THE FRENCH LAUNDRY restaurant, and additional data fields 254-2d.

The restaurant category field 254-2a may include multiple categories under which the restaurant is categorized, such as the text labels "French cuisine" and "contemporary." The name and description field 254-2b may include the name of the restaurant ("The French Laundry") and text that describes the restaurant. The user reviews field 254-2c may include text of user reviews for the restaurant. The additional data fields 254-2d may include additional data for the restaurant that does not specifically fit within the other defined fields, such as a menu, prices, and operating hours.

Continuing with FIG. 3A, the app ID 250-3 uniquely identifies an application associated with the app state record 250. For example, a value for application ID 254-3 in the app state record 254 uniquely identifies the OpenTable application. The application ID 254-3 may refer to a canonical OpenTable software product that encompasses all of the editions of the OpenTable application, including all the native versions of the OpenTable application across platforms (for example, IOS and ANDROID operating systems) and any web editions of the OpenTable application.

The access mechanisms 250-4 specify one or more ways that the state specified by the app state record 250 can be accessed. For any given user device, only some of the access mechanisms 250-4 may be relevant. For illustration, the example app state record 254 depicts three access mechanisms 254-4, including access mechanism "a" 254-4a, access mechanism "b" 254-4b, and access mechanism "c" 254-4c.

For example, the access mechanism 250-4a may include a reference to a native IOS operating system edition of the OPENTABLE application along with one or more operations to be performed by the user device. For example, the access mechanism 250-4a may include an application resource identifier for the native iOS edition of the OPENTABLE application and one or more operations that navigate to the state in the OPENTABLE application for THE FRENCH LAUNDRY restaurant.

The access mechanism 250-4b may include a reference to a native ANDROID operating system edition of the OPENTABLE application along with one or more operations to be performed by the user device to navigate to the state in the ANDROID OPENTABLE application for THE FRENCH LAUNDRY. The access mechanism 250-4c may include a reference to a web edition of the OPENTABLE application, such as a URL that corresponds to a web page for THE FRENCH LAUNDRY restaurant on the OPENTABLE web site.

Static-Analysis-Assisted Dynamic Analysis

Crawling an app may allow app states to be identified, and metadata and content collected. The metadata and content may be stored, such as in the search data store 210. A simple web crawler may mechanically follow every link encountered on a website, crawling every possible path. This requires substantial resources, and may impose a burden on the servers of the website being crawled. When crawling an application, crawling may be even slower and more resource-intensive. Focusing the crawling of an application is therefore desirable, which may include limiting the app states that are crawled or allowing those app states that are crawled to be accessed more efficiently.

As one example, crawling may be focused by performing static analysis. In general, static analysis refers to an analysis of an application (such as an application package available from a digital distribution platform) without actually executing the application The user interface of an application may be developed using app state templates. When the app is executed, an app state template is populated with data to create an app state for presentation to the user. Each app state template may correspond to a different action. For example, a restaurant review app may include a state template for displaying a list of restaurants, a state template for displaying a map of restaurant locations, and a state template for displaying information of an individual restaurant. In other words, every state that displays individual restaurant information is created by instantiating the same app state template using different data.

For simplicity and conciseness, an app state template may be referred to as an activity. Each state can be described as the instantiation of an activity for a specific entity (such as a specific restaurant). When a user executes the application, the user interface may allow the user to navigate from a state where restaurants are listed (which may be instantiated from a restaurant listing activity) to a state where information about a specific restaurant is displayed (which may be instantiated from a restaurant info activity).

With states being instantiated dynamically from activities, static analysis may have no specific states to analyze. However, the relationships between activities may be determined. For example, static analysis may reveal that a user can navigate from the restaurant listing activity to the restaurant info activity. After static analysis, a graph is formed of the transitions between activities. Because there may be multiple ways of a user reaching a state within the application, there will likely be multiple ways of reaching various activities in the activity graph.

An optimization of the graph may be performed to determine the shortest path between activities. In this way, when crawling individual app states in an executing application, navigating to a desired state can be more efficient. In addition, the activity graph may be analyzed to determine which activities are of greater interest, thereby determining which app states should be crawled.

When an application is executed, the application may begin in a home, or default, state. The activity used to generate this state may be referred to as the home activity. The activity graph may be optimized to identify the shortest path from the home activity to each other activity. Any link from one activity to another that does not form part of one of the shortest paths is eliminated. With this optimized graph, a crawler attempting to reach a desired app state in an executing application determines which activity corresponds to the app state to be crawled and navigates to the app state to be crawled based on the shortest path defined in the activity graph.

The crawler may determine that some activities can be reached directly using a predetermined programming call (which may be referred to as an "intent"). The intent may be invoked with specific data that identifies a specific state. Once data for specific states is acquired during dynamic analysis of the application, these specific states may be reached directly by invoking the corresponding intents. These direct links may be stored into an updated activity graph indicating the single hop path from the home activity to the activity corresponding to an intent.

Figure 4:
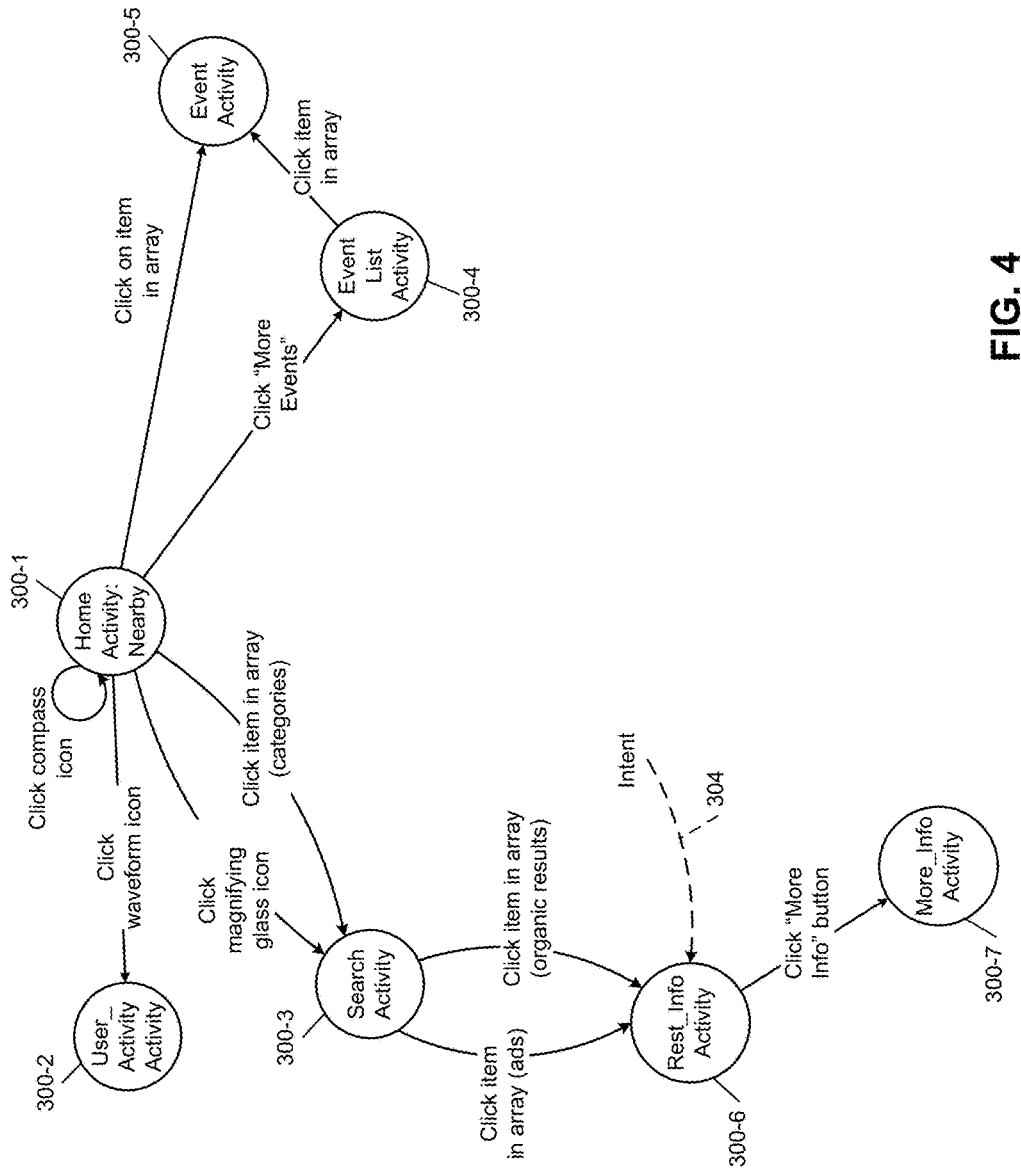
FIG. 4 is an illustration of a graph structure determined by static analysis of an example app.

Turning to FIG. 4, a subset of an example static analysis is shown for an example application, such as the YELP app. A home activity 300-1 corresponds to the state that is invoked when the YELP app is opened. For illustration only, this home activity 300-1 may correspond to a "nearby" state of the YELP app in which businesses located near the user's current location are listed.

A number of user interface interactions can occur in an app state corresponding to the home activity 300-1. For example, a compass icon may be selected, which simply causes the app to remain in the home activity 300-1. Selection may be performed by a mouse, a keyboard, buttons, or touchscreen interactions, such as taps, presses, and swipes. The term "click" may be used to generically refer to selection, including selection with a touchscreen.

Selecting a waveform icon transitions to a state of an activity 300-2 that presents activity of the user logged into the YELP app. Selecting a magnifying glass icon transitions to a state of an activity 300-3 that allows for searching of entities, such as restaurants. From the state corresponding to the home activity 300-1, an item in an array may be selected that also transitions to the search activity 300-3. For illustration, this array may correspond to various categories of the YELP app, such as "restaurants" and "bars."

A "More Events" user interface element may be selected to transition to a state of an activity 300-4 that provides an event list. There may be an array of events present on the home activity 300-1. Selecting an item from that array causes a transition to an event activity 300-5. Similarly, selecting an item in an array in the event list activity 300-4 causes a transition to the event activity 300-5.

In the search activity 300-3, selecting an item in one array causes a transition to a restaurant info activity 300-6. Although the static analysis may be unaware of this distinction, for illustration purposes this first array includes advertisements. Selecting an item in another array, which for illustration includes organic search results, also leads to the restaurant info activity 300-6. From the restaurant info activity 300-6, selecting a "More Info" button causes the transition to a more info activity 300-7.

Static analysis may also be able to identify that an intent 304 can be fired to arrive directly at the restaurant info activity. However, during static analysis, the values to populate the parameters of the intent 304 are not known, and therefore dynamic analysis of various states may be necessary to determine what values can successfully populate the intent 304. Then, the intent 304 can be invoked with specific values to arrive at specific states.

In FIG. 5A, a graph of example generic activities A-G (320-1 through 320-7, respectively) is shown with edges indicating transitions that are possible between any two of the activities A-G in a hypothetical application. In FIG. 5B, an optimized graph is shown, where only edges corresponding to a single least-hop path from the head node (Node A) to another node are preserved. Duplicate edges and edges only used in non-shortest paths are removed. This eliminates cyclic dependencies—i.e., two activities that have paths that can lead to one another. The removal of cyclic dependencies may help the crawler avoid falling into an endless loop.

The original graph of FIG. 5A may be retained in case the edges remaining in FIG. 5B turn out to be deficient during dynamic analysis. For example only, if the edge from state A 320-1 to state E 320-5 is not active (for example, the user interface element of activity A 320-1 that corresponds to this link is un-selectable for some reason), another path to activity E 320-5 may be selected from FIG. 5A. For example only, a longer path through activity D 320-4 may be used.

Figure 6:
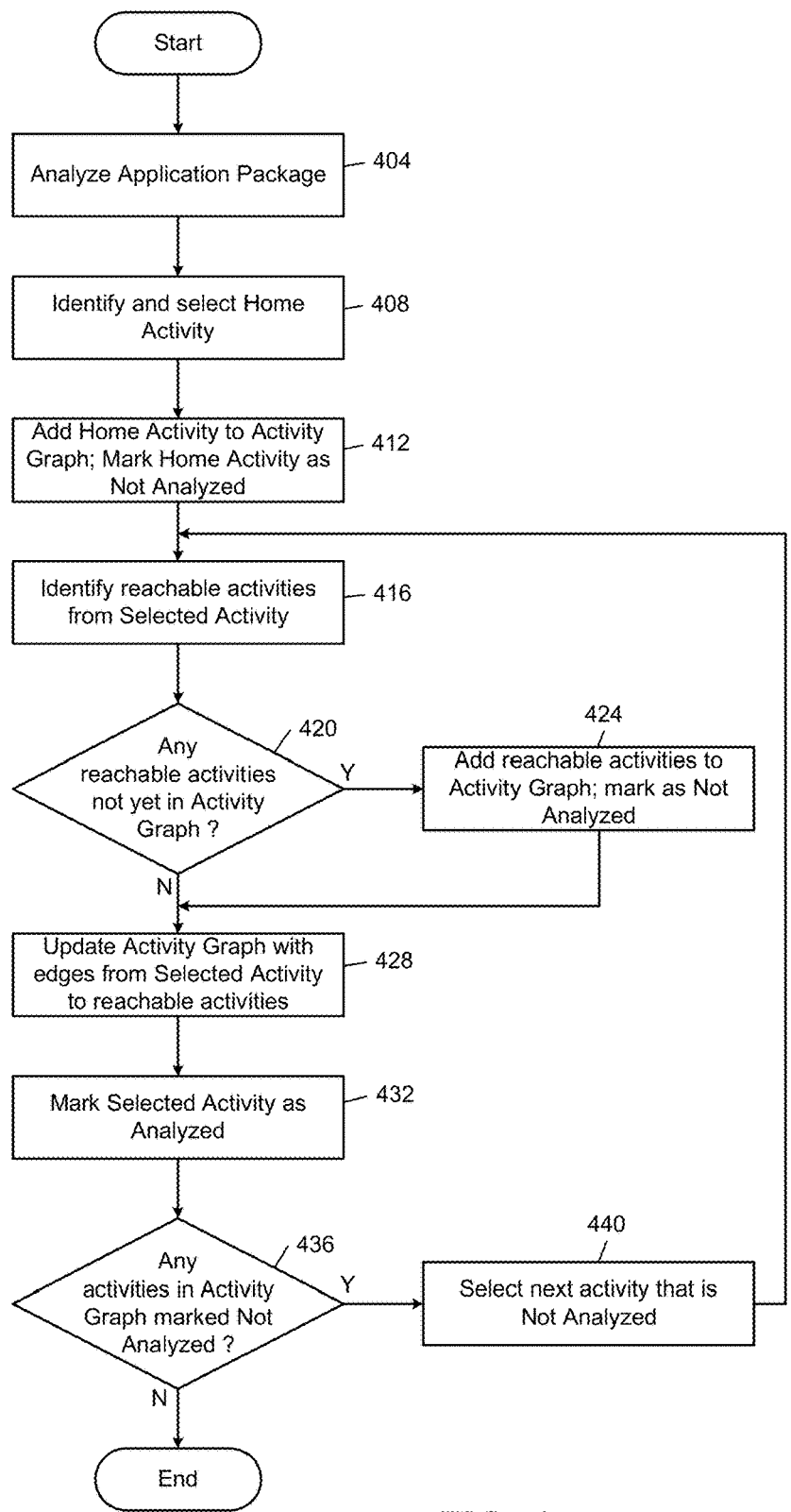
FIG. 6 is a flowchart of example activity graph creation.

In FIG. 6, example creation of an activity graph is shown. Control begins at 404, where an application package for an application to be crawled is analyzed. In various implementations, the application package may be an APK (ANDROID application package) file, which may include manifest files, header files, resource files, source code, and object code. At 408, control identifies a home activity, which may correspond to the home state when the application is launched. The home activity and home state may also be referred to as a default activity and default state. The home activity is then selected for further processing.

At 412, control adds the home activity to the activity graph as the head node of the graph. Control then marks the home activity as not yet having been analyzed. For example, this may be a Boolean flag, where one of the two Boolean states indicates that the home activity has not yet been analyzed. At 416, control identifies which activities are reachable from the selected activity. At 420, if any of the reachable activities are not yet in the activity graph, control transfers to 424; otherwise, control transfers to 428. At 424, control adds the reachable activities to the activity graph and marks the newly added activities as not analyzed. Control then continues at 428.

At 428, the activity graph is updated to add edges directed from the selected activity to the reachable activities. At 432, control marks the selected activity as analyzed. At 436, control determines whether there are any activities in the activity graph that are still marked as not analyzed. If so, control transfers to 440; otherwise, creation of the initial activity graph is complete and control ends. At 440, control selects the next activity that is not analyzed as the selective activity. Control then returns to 416.

To optimize the activity graph, a wide variety of graph theory algorithms are available, including spanning tree. The optimized graph may be determined using a depth-first search tree or a breadth-first search tree. As one example only, a simplistic algorithm may begin with the home activity and attempt to find all paths to a first of the other activities. While identifying paths, every possible path may be considered, with each path terminating if the path leads back to an activity already encountered during the path. This restriction causes only non-cyclic paths to be determined from the home activity to the first activity.

The algorithm may then select the path having the least number of transitions. If there are multiple paths having the least number of transitions, control may select the first encountered path that has the fewest number of transitions. This process is repeated for each of the other activities. Once shortest paths are selected for each of the other activities, any transitions (or, edges) in the activity graph that are not part of one of the shortest paths are eliminated to create the optimized graph.

Figure 7:
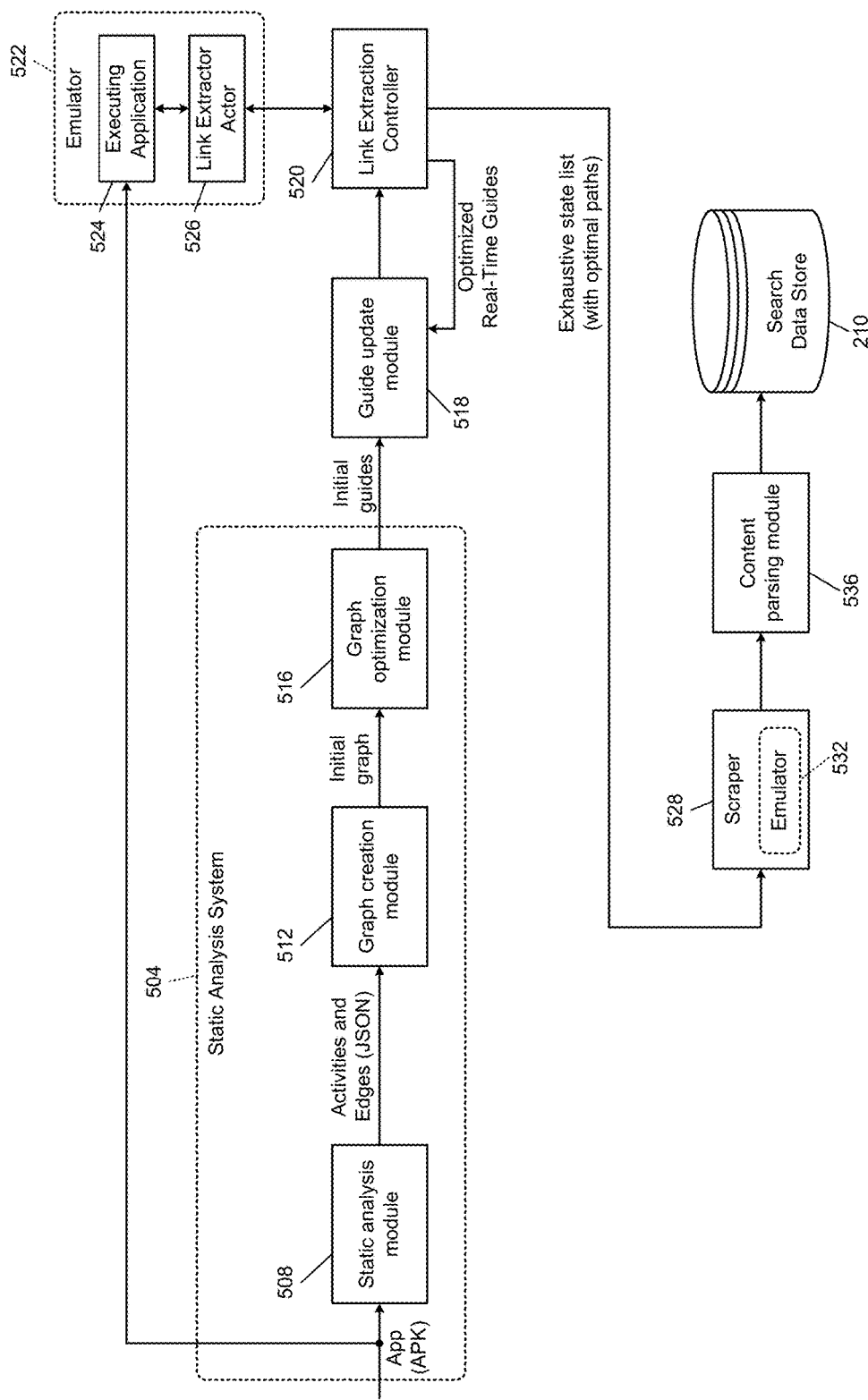
FIG. 7 is a functional block diagram of app crawling using static analysis guide creation.

In FIG. 7, a functional block diagram of a crawling system using static analysis is shown. A static analysis system 504 includes a static analysis module 508 that receives an application of interest. The static analysis module 508 generates an output including a list of all activities available in the application of interest, and potential transitions from each activity to every other activity. For example only, this output may be formatted as a JSON (JavaScript Object Notation) file or data structure.

As a simple example, consider the fictional application "WidgetTest," which has five activities. In each activity there are four user interface elements, such as buttons, each navigating to another activity. The static analysis module 508 therefore creates an output with a list or array of the five activities and with a list of the twenty transitions enabled by the buttons.

A graph creation module 512 analyzes the output of the static analysis module 508 and constructs a graph representation of the activities and edges. This initial graph is provided to a graph optimization module 516, which may identify the shortest path from one activity to another. Specifically, the shortest paths may all begin with the home activity. The metric for determining how short a path is may simply be the number of transitions between activities.

Other metrics may include number of user interface interactions to navigate to the target state or estimated time delay to reach the target state. In some implementations, the number of user interface interactions may be determined by static analysis, such as in the static analysis module 508. For example, a transition may be possible from one activity to another activity, but that transition may require multiple user interface interactions.

The estimated amount of time may be based on assumptions according to amount of network activity. For example, a transition that appears to require a network call may be assumed to take longer than a transition that involves no network communication. Such a network call may be made by an app to retrieve data from the app's developer, such as information pertaining to a restaurant of interest.

The graph optimization module 516 provides the optimized paths to a guide update module 518. The guide update module 518 may be omitted in various implementations. When present, the guide update module 518 may update shortest paths when a shorter path is observed during dynamic analysis of the application. For example, an intent or other programming call may allow an activity to be reached directly from the home activity. Once the data required by the programming call is identified, the programming call may be invoked to transition directly to the target activity. This updated guide may be stored as a preferred alternative by the guide update module 518.

A link extraction controller 520 operates one or more emulators. For ease of illustration a single emulator 522 is shown in FIG. 7. The emulator 522 emulates an operating system, such as the ANDROID operating system, for the application of interest. In various implementations, the emulator 522 may be instantiated at a cloud hosting operator that may provide compute facilities within which to execute emulator code or that may directly provide emulators for one or more mobile device operating systems.

In other implementations, a physical device running the operating system may be used. For example, some operating systems may not have suitable emulators. The physical device may be connected to the link extraction controller 520 using a wireless or wired interface, such as USB (universal serial bus). For scale, multiple emulators and/or physical devices may be controlled by the link extraction controller 520 to scrape the same or different applications. As an example only, a bank of physical smartphones may all be connected via USB to an interface card that is controlled by the link extraction controller 520.

The application of interest is executed within the emulator 522 at 524. The link extraction controller 520 identifies states of interest corresponding to each of the activities specified by the guide update module 518. In order to reach a state within the executing application 524 corresponding to an activity, the link extraction controller 520 sends the shortest path specified by the guide update module 518 to a link extractor actor 526. When navigating between states, if the link extractor actor 526 identifies that an intent is available to reach an activity, the link extraction controller 520 passes this information back to the guide update module 518 as an optimized real-time guide.

The link extractor actor 526 executes within the emulator 522 and communicates with the executing application 524 using accessibility hooks or events. The link extractor actor 526 may include a scraping module to provide the link extraction controller 520 with information regarding a state. The link extraction controller 520 can then identify a path to follow from the scraped information and instruct the link extractor actor 526 to follow that path. In other words, the link extractor actor 526 can provide simulated user input to the executing application 524 and extract content from each displayed state of the executing application 524.

In implementations where the emulator 522 is instead a physical device, the link extractor actor 526 may be installed as a root-level application on the physical device. Installing a root-level application may include installing the link extractor actor 526 as a launcher replacement and bypassing security limitations of the firmware or operating system regarding privileges of installed apps.

For each state of interest, the link extraction controller 520 generates a breadcrumb trail. The breadcrumb trail identifies the shortest path to reach the state of interest, and includes the programming calls and user interface events necessary to reach the target state. In some circumstances, a programming call followed by one or more user interface events may be required to reach the target state.

A list of breadcrumb trails for states of interest is provided to a scraper 528. As an example only, an example state list is shown in FIG. 11, with each state accompanied by a breadcrumb trail. The state list is used by the scraper 528 to reach each of the states of interest and extract their contents. The scraper 528 uses an emulator 532 to follow the breadcrumb trail for each of the states specified by the link extraction controller 520.

Within the emulator 532, the scraper 528 injects specified programming calls and replays user interface events as specified in the breadcrumb trail for each state of interest. In various implementations (not shown), the scraper 528 may be implemented similarly to link extraction, with the scraper 528 acting as a scraper controller, the emulator 532 being separate from the scraper 528, and a scraper actor executing within the emulator 532, and in communication with the scraper 528.

Upon arriving at the target state, the scraper 528 extracts text, images, and metadata from the state. This information is passed to a content parsing module 536. In other implementations, the data from the scraper 528 may be stored directly into a data warehouse or database. The scraper 528 may be implemented as a scraping manager that concurrently runs multiple emulators including the emulator 532. Each of the emulators can then independently traverse paths to different states. The scraping manager therefore distributes responsibility for the states of interest across the emulators and collates the scraped data.

The content parsing module 436 may identify content of interest from scraped states and map that data to specific fields to create app state records in the search data store 210. The content parsing module 436 may perform a combination of parsing, transformation, categorization, clustering, etc.

In one example, the static analysis module 508 accepts the APK file of the EAT24 restaurant delivery app and generates a JSON output, an excerpt of which is shown here for illustration:

```
{
  "source":
    "com.eat24.app.activities.ChatEnterActivity",
  "paths": [
    {
      "id": 586,
      "length": 2,
      "widgets": [
        [
          "android.widget.LinearLayout
id$dlg_account_menu_orderhistory"
        ],
        [
          "android.view.View id$actionbar_account"
        ]
      ],
      "launchsite": [
        "<com.eat24.app.activities.OrdersHistoryActivity:
void
ShowOrdersHistory(android.content.Context,java.lang
.Integer,java.lang.String)>@virtualinvoke
$r0.<android.content.Context: void
startActivity(android.content.Intent)>($r3)"
      ]
    },
```

```
{
  "id": 587,
  "length": 1,
  "widgets": [
    [
      "android.widget.LinearLayout
       id$dlg_account_menu_creditcards"
    ]
  ],
  "launchsite": [
    "<com.eat24.app.activities.CreditCardsActivity:
     void
     StartNew(android.content.Context)>@virtualinvoke
     $r0.<android.content.Context: void
     startActivity(android.content.Intent)>($r1)"
  ]
}
```

This represents two of several paths available in the activity "com.eat24.app.activities.ChatEnterActivity." The "widgets" array includes the list of widgets to be selected to reach the activities mentioned in the "launchsite" tag.

The graph optimization module 516 may output the guides in the form of breadcrumb files. For example, see the following example breadcrumb file used to navigate from a ChatActivity activity to a RestaurantInfoAndReviews activity for the EAT24 app:

```
<?xml version="1.0" encoding="UTF-8"?> <app
    name="Eat24" pkg="com.eat24.app"
    domain="www.eat24.com">
<deeplink platform="Android" version="1002403"
    versionName="2.5.1">
<intent data="eat24://chat"
    component="com.eat24.app/.activities.SplashActivity"/>
<breadcrumb widgetClass="android.view.View"
    widgetID="com.eat24.app:id/actionbar_account"
    action="click"
    targetState="com.eat24.app.activities.OrdersHistory
    Activity"/>
<breadcrumb widgetClass="android.widget.LinearLayout"
    widgetID="com.eat24.app:id/dig_account_menu_orderhistory"
    action="click"
    targetState="com.eat24.app.activities.OrdersHistory
    Activity"/>
<breadcrumb widgetClass="android.view.View"
    widgetID="com.eat24.app:id/actionbar_support"
    action="click"
    targetState="com.eat24.app.activities.ChatEnterActivity,com.-
    eat24.app.activities.OrderStatusActivity"/>
<breadcrumb widgetClass="android.widget.TextView"
    widgetID="com.eat24.app:id/act_orderstatus_open_map"
    action="click"
    targetState="com.eat24.app.activities.RestaurantInfo
    AndReviews"/>
</deeplink> </app>
```

Figure 8:
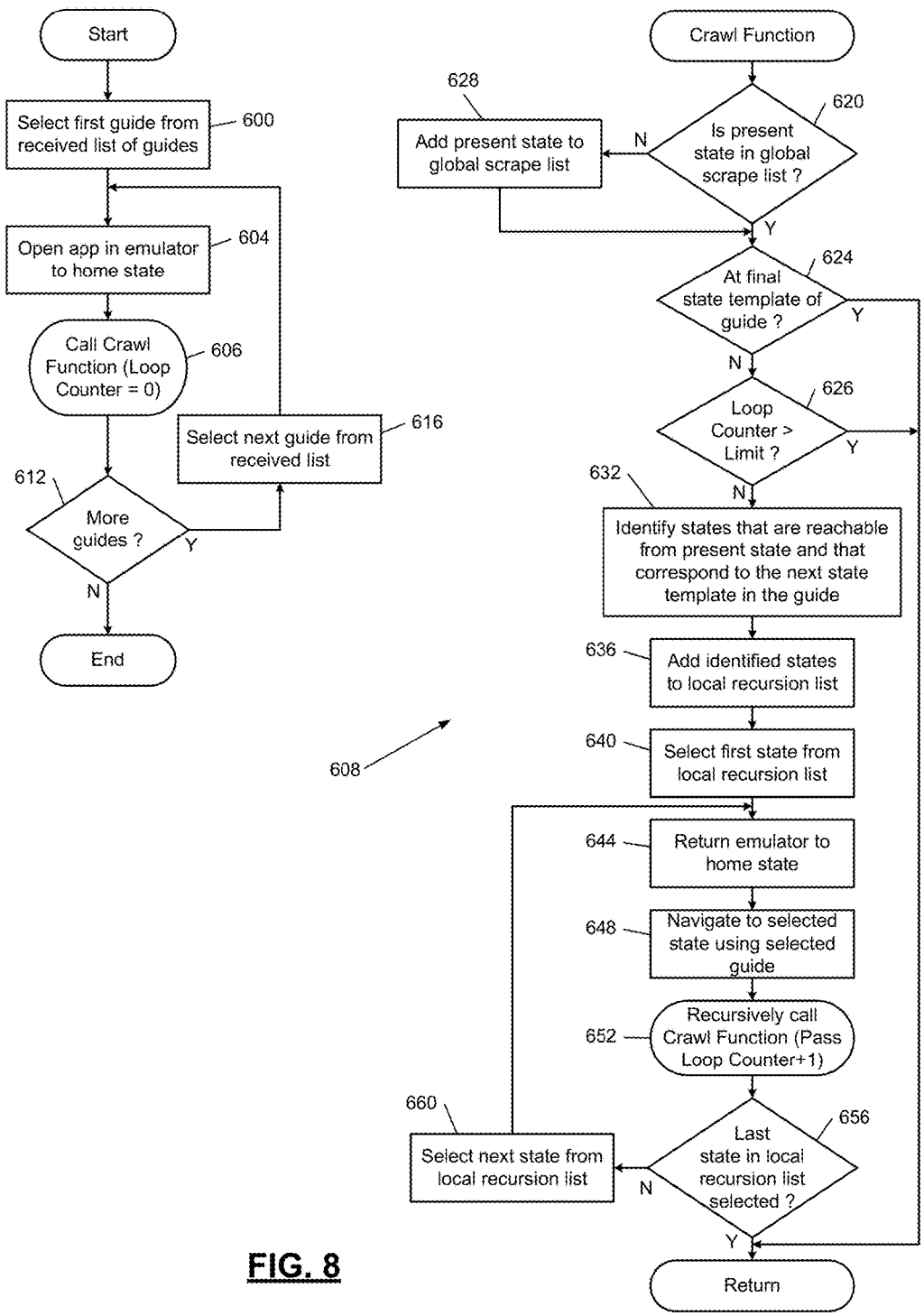
FIG. 8 is a flowchart depicting example app link extraction based on static-analysis-assisted guides.

In FIG. 8, recursive crawling is described for guides that are based on static analysis. Because the analysis was static, no states were selected by an operator or a computer. Instead, transitions between activities were defined. The app link extractor may therefore infer that any state transition that matches a state template transition in the guide will point to a state of interest for scraping.

As described above, guides generated by static analysis do not describe specific states because the necessary parameters to determine a state from an activity are not present in static analysis. For example only, static analysis may identify that a transition from a restaurants list activity to a restaurant info state activity is part of an optimal (fewest number of hops) path between two activities.

App link extraction operates dynamically and therefore has fully-formed states to evaluate. Based on the guides provided by static analysis, app link extraction may identify all states that result from specified transitions as states to scrape. Continuing the above example, every restaurant info state (a specific instantiation of the restaurant info state template) that results from a transition from a restaurant listing state (a specific instantiation of the restaurant listing state template) should be scraped.

In various implementations, each hop along an activity guide may correspond to transitions from one state to multiple different states generated from the same activity. Therefore, the crawl through the states for a single state template guide may expand exponentially with each transition from a state of one state template to a state of another state template in the guide. This situation may lend itself to recursion as described here.

Control begins at 600, where a first guide is selected from a list of guides received from a static-analysis-assisted guide creator. Again, these guides specify transitions from state template to state template, not from specific state to specific state. At 604, control opens an app of interest to a home state in an emulator.

At 606, control calls a recursive crawl function 608 and passes in a loop counter value of zero, which is described in more detail below. Once the crawl function 608 returns, control continues at 612. If there are more guides in the received list, control transfers to 616; otherwise, control ends. At 616, control selects the next guide from the received list and returns to 604.

When the crawl function 608 is called, control begins at 620 and determines whether the present state is already in the scrape list. If so, control transfers to 624; otherwise, control transfers to 628. The scrape list is a global scrape list, meaning that each instantiation of the crawl function 608 supplements the same global scrape list. At 628, control adds the present state to the global scrape list and continues at 624.

At 624, control determines whether the present state is an instantiation of the final state template of the selected guide. If so, control returns from the crawl function 608. Otherwise, control continues at 626. At 626, control determines whether the value of the loop counter received by the crawl function is greater than a limit. If so, control returns from the crawl function 608; otherwise, control continues at 632. Checking the loop counter allows the depth of recursion to be limited so that recursion does not continue indefinitely.

At 632, control identifies states that are reachable from the present state and that correspond to the next state template in the selected guide. At 636, control adds the identified states to a local recursion list. The recursion list is referred to as local because the recursion list has a scope that is specific to this instantiation of the crawl function 608.

At 640, control selects the first state from the local recursion list. At 644, control returns the app to the home state within the emulator. At 648, control navigates to the selected state of the local recursion list using the selected guide. At 652, control recursively calls the crawl function 608 with an incremented value of the loop counter. When control returns from the crawl function, control continues at 656. If the last state in the local recursion list is presently selected, control returns from this invocation of the crawl function 608. Otherwise, control transfers to 660, where the next state from the local recursion list is selected. Control then returns to 644.

Figure 9:
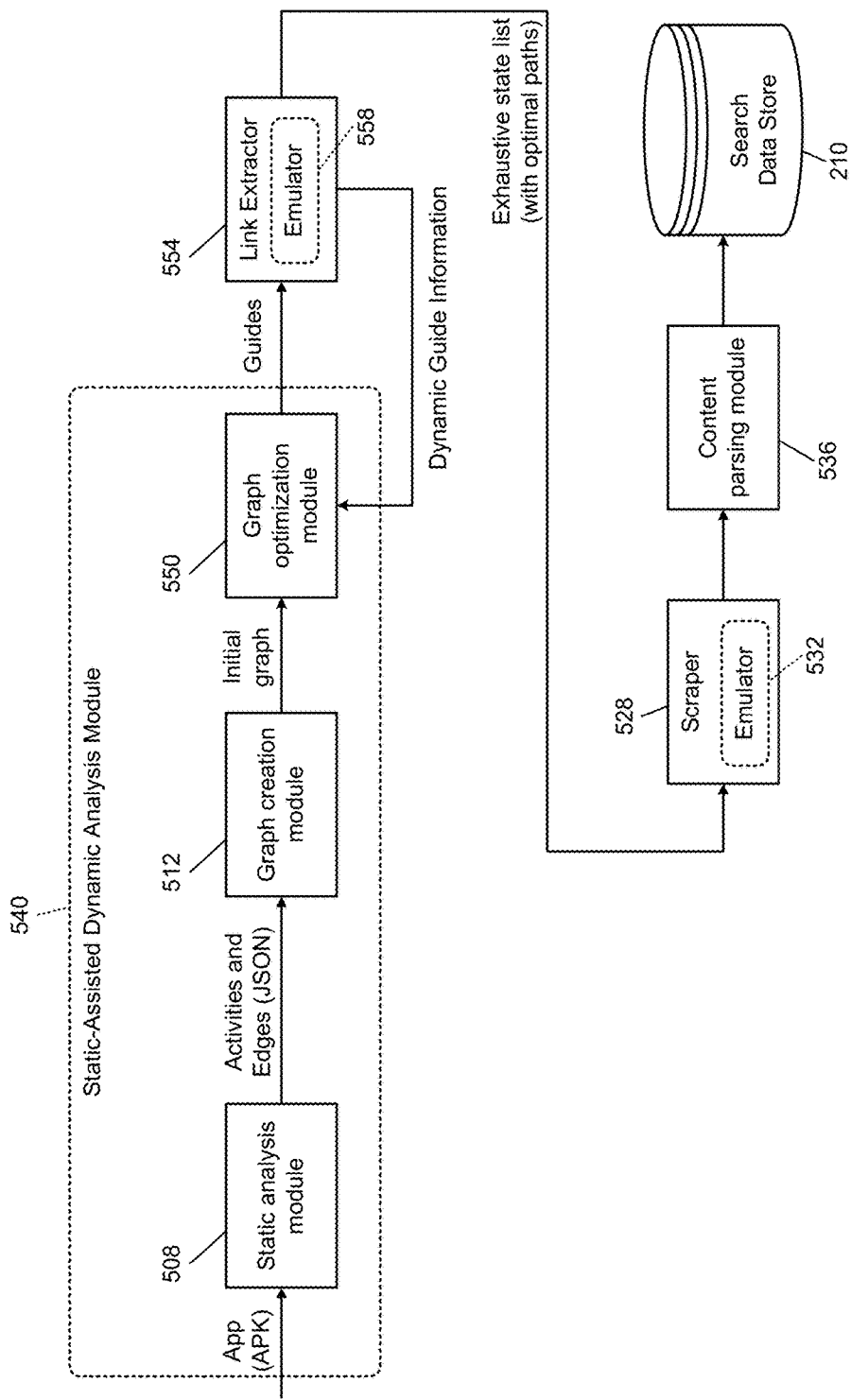
FIG. 9 is a functional block diagram of app crawling using static-analysis-assisted dynamic analysis.

FIG. 9 is a functional block diagram similar to FIG. 7 but with dynamic feedback provided to the static analysis. While the graph optimization module 516 and the link extraction controller 520 of FIG. 7 are shown as separate blocks, they may interact to ensure that edges determined in static analysis are actually available and traversable in a live (emulated) environment. Paths that would appear to be optimal based on fewest number of hops may, in some implementations, not be reachable when actually executing the app.

Therefore, a static-assisted dynamic analysis module 540 includes a graph optimization module 550 that feeds potential guide information to a link extractor 554. If the link extractor 554 determines, using an emulator 558, that a shortest path is not reachable, this information is fed back to the graph optimization module 550 and traversal of other, longer paths is attempted. In addition, the link extractor 554 may feed intent data back to the graph optimization module 550.

In various implementations, the link extractor 554 may be implemented similarly to that of FIG. 7, with the link extractor 554 operating as a link extraction controller, the emulator 558 being separate from the link extractor 554, and with a link extractor actor that executes within the emulator 558 and is in communication with the link extractor 554.

In various implementations (not shown), the scraper 528 may be implemented similarly to link extraction, with the scraper 528 acting as a scraper controller, the emulator 532 being separate from the scraper 528, and a scraper actor executing within the emulator 532, and in communication with the scraper 528.

Figure 10:
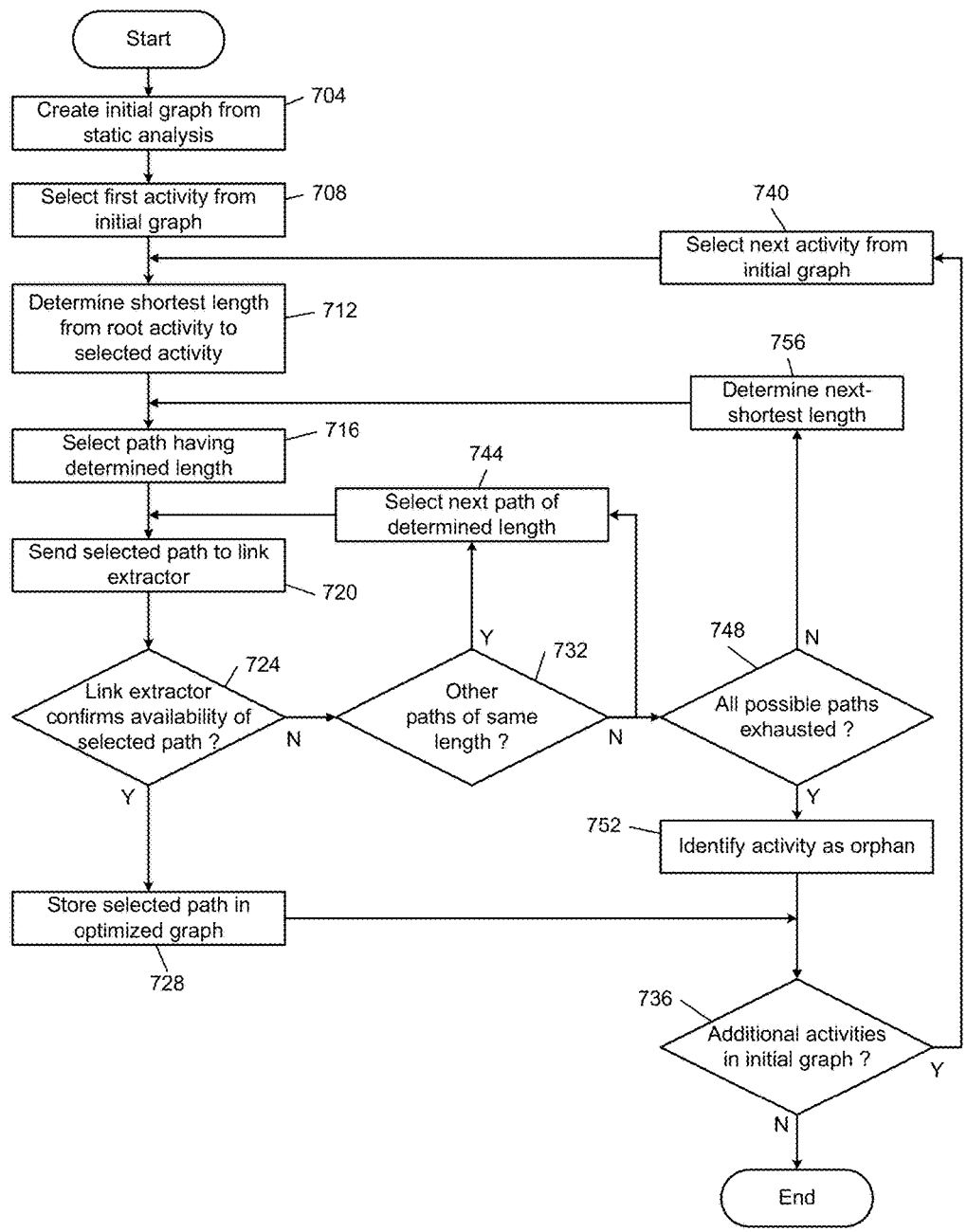
FIG. 10 is a flowchart of path optimization based on a combination of static and dynamic analysis.

FIG. 10 is a flowchart of example operation of FIG. 9. Control begins at 704, where an initial graph is created from the static analysis. At 708, control selects the first activity after the root activity (corresponding to the home state) from the initial graph. At 712, control determines a shortest length from the root activity to the selected activity. At 716, control selects a path having the determined length. At 720, control sends the selected path to the link extractor. At 724, if the link extractor can confirm availability of the path in an emulated environment, control transfers to 728; otherwise, control transfers to 732.

At 728, control stores the selected path in an optimized graph, and continues at 736. At 736, control determines whether additional activities are present in the initial graph and, if so, control transfers to 740; otherwise, control ends. At 740, control selects the next activity from the initial graph and continues at 712. At 732, control determines whether there are other paths of the same determined length, if so, control transfers to 744 where the next path of the determined length is selected, and control continues at 720. If, at 732, other paths of the same length are not present, control transfers to 748.

At 748, if all possible paths have been exhausted, control transfers to 752; otherwise, control transfers to 756. At 752, the activity is identified as an orphan that is apparently unreachable using any of the paths identified in static analysis. Control then continues at 736. At 756, control determines the next-shortest-length path from the root activity to the selected activity, and control continues at 716.

In FIG. 11, an example state list includes states identified during crawling, as well as a corresponding breadcrumb trail for each. The breadcrumb trail can be followed by a scraper in order to reach the designated state. For example, the state for STARBUCKS store numbered 235 has a single-item breadcrumb trail. Specifically, invoking an intent leads directly to this state. Note that the text label is shown in FIG. 11 only for illustration, as the crawler itself does not need to, and likely does not, recognize that the state corresponds to Starbucks store #235.

Another state, labeled for illustration as the "More Info" view of Starbucks store #235, requires two actions. The first is to invoke an intent, and the second is to actuate a user interface element corresponding to "More Info". Again, the crawler may not appreciate the fact that a user interface (UI) element (or, widget) with a text label of "More Info" will cause additional information to be provided about the same establishment. Instead, the crawler simply identifies that a selection (referred to generically as a "click", even though it may actually require a touchscreen interaction) of UI Widget A leads to that state. Sending a UI event to the app to select UI Widget A is the second action in the breadcrumb trail to arrive at this state.

Overall

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

What is claimed is:

1. An apparatus for automated acquisition of content from an application and improved searching of the content in response to a query from a user device, the apparatus comprising:
    a memory; and
    at least one processor performing static analysis, the at least one processor being configured to, using static analysis:
        identify application state templates of the application, and
        identify user interface elements that are configured to transition between states instantiated from different ones of the identified application state templates,
    wherein the static analysis includes analyzing code of the application independent of executing the code,
    wherein the at least one processor performs graph creation, the at least one processor being further configured to create a graph data structure including nodes and edges connecting the nodes, wherein the nodes correspond to the identified application state templates, and wherein the edges correspond to transitions between the identified application state templates corresponding to the identified user interface elements,
    wherein the at least one processor performs link extraction, the at least one processor being further configured to:
        execute the application, and
        determine and record paths to application states within the executing application according to the graph data structure,
    wherein the at least one processor performs scraping, the at least one processor being further configured to, within an executing instance of the application, extract text and metadata from application states corresponding to endpoints of the recorded paths, wherein information based on the extracted text and metadata is stored in the memory of the apparatus, and
    wherein the at least one processor is further configured to transmit search results in response to the query from the user device.

2. The apparatus of claim 1, wherein the at least one processor performs graph optimization, the at least one processor being further configured to create an optimized graph data structure by (i) removing cycles from the graph data structure and (ii) removing redundant edges from the graph data structure, wherein the at least one processor extracts links according to the optimized graph data structure.

3. The apparatus of claim 2, wherein the graph data structure includes a head node corresponding to a default application state template of the application and wherein, upon execution, the application presents a state instantiated from the default application state template.

4. The apparatus of claim 3, wherein the edges are directed and each have a starting node and an ending node, wherein the starting node corresponds to an application state template having a user interface event configured to cause a transition to the ending node, and wherein none of the edges have the head node as the ending node.

5. The apparatus of claim 4, wherein the at least one processor is further configured to create the optimized graph data structure such that:
   each of the nodes of the graph data structure is present in the optimized graph data structure;
   the optimized graph data structure retains edges from the graph data structure required for, for each node of the nodes that is not the head node, a shortest path from the head node to the node; and
   the optimized graph data structure omits edges not required for the shortest paths.

6. The apparatus of claim 1, wherein extraction of links by the at least one processor includes the at least one processor being further configured to, for each path defined by the graph data structure, follow the path within the executing application and add application states reachable from an endpoint of the path to an application state list.

7. The apparatus of claim 6, wherein extraction of links by the at least one processor includes the at least one processor being further configured to, for each path defined by the graph data structure, add application states reachable from intermediate states along the path to the application state list.

8. The apparatus of claim 6, wherein extraction of links by the at least one processor includes the at least one processor being further configured to, for each application state in the application state list, record a series of user interface events used to reach the application state.

9. The apparatus of claim 8, wherein scraping by the at least one processor includes the at least one processor being further configured to, for each application state in the application state list, (i) reach the application state by replaying the recorded series of user interface events to the executing application and (ii) extract text and metadata from the application state.

10. The apparatus of claim 1, wherein the at least one processor is further configured to generate an updated graph data structure based on the graph data structure in response to real-time data from link extraction performed by the at least one processor, wherein the at least one processor is further configured to operate based on the updated graph data structure.

11. The apparatus of claim 10, wherein the at least one processor is further configured to generate the updated graph data structure by, in response to a direct programming call being available to reach a first node of the nodes, creating a new edge directly from a head node of the nodes to the first node.

12. The apparatus of claim 1, wherein link extraction by the at least one processor includes the at least one processor being further configured to execute the application within an emulator.

13. The apparatus of claim 12, wherein scraping by the at least one processor includes the at least one processor being further configured to execute the instance of the application within a second emulator.

14. A search apparatus for improved acquisition of content and searching of the content in response to a query from a user device, the search apparatus comprising:
   a memory; and
   at least one processor performing static analysis, the at least one processor being configured to, using static analysis:
      identify application state templates of the application, and
      identify user interface elements that are configured to transition between states instantiated from different ones of the identified application state templates,
   wherein the static analysis includes analyzing code of the application independent of executing the code,
   wherein the at least one processor performs graph creation, the at least one processor being further configured to create a graph data structure including nodes and edges connecting the nodes, wherein the nodes correspond to the identified application state templates, and wherein the edges correspond to transitions between the identified application state templates corresponding to the identified user interface elements,
   wherein the at least one processor performs link extraction, the at least one processor being further configured to:
      execute the application, and
      determine and record paths to application states within the executing application according to the graph data structure,
   wherein the at least one processor performs scraping, the at least one processor being further configured to, within an executing instance of the application, extract text and metadata from application states corresponding to endpoints of the recorded paths, wherein information based on the extracted text and metadata is stored in the memory of the search apparatus;
   wherein the at least one processor performs set generation, the at least one processor being further configured to, in response to a query from a user device, select records from the memory to form a consideration set of records,
   wherein the at least one processor performs set processing, the at least one processor being further configured to assign a score to each record of the consideration set of records,
   wherein the at least one processor performs results generation, the at least one processor being further configured to respond to the user device with a subset of the consideration set of records to display results of the query on the user device, wherein the subset is selected based on the assigned scores, and
   wherein the at least one processor is further configured to transmit search results in response to the query from the user device.

15. A method of automated acquisition of content from an application and improved searching of the content in response to a query from a user device, the method comprising:
   using static analysis, performed by at least one processor of an apparatus for automated content acquisition and provision, the static analysis identifying application state templates of the application, wherein the static analysis includes analyzing code of the application independent of executing the code;
   using static analysis, performed by the at least one processor, identifying user interface elements that are configured to transition between states instantiated from different ones of the identified application state templates;
   creating, using the at least one processor, a graph data structure including nodes and edges connecting the nodes, wherein the nodes correspond to the identified application state templates, and wherein the edges correspond to transitions between the identified application state templates corresponding to the identified user interface elements;
   executing, using the at least one processor the application;
   determining and recording paths to application states within the executing application according to the graph data structure;

within an executing instance of the application, extracting, using the at least one processor, text and metadata from application states corresponding to endpoints of the recorded paths; and storing information based on the extracted text and metadata in a memory of the apparatus, wherein the at least one processor is further configured to transmit search results in response to the query from the user device.

16. The method of claim 15, further comprising creating an optimized graph data structure by (i) removing cycles from the graph data structure and (ii) removing redundant edges from the graph data structure, wherein determining and recording is performed according to the optimized graph data structure.

17. The method of claim 16, wherein the graph data structure includes a head node corresponding to a default application state template of the application and wherein, upon execution, the application presents a state instantiated from the default application state template.

18. The method of claim 17, wherein the edges are directed and each have a starting node and an ending node, wherein the starting node corresponds to an application state template having a user interface event configured to cause a transition to the ending node, and wherein none of the edges have the head node as the ending node.

19. The method of claim 18, wherein:
each of the nodes of the graph data structure is present in the optimized graph data structure;
the optimized graph data structure retains edges from the graph data structure required for, for each node of the nodes that is not the head node, a shortest path from the head node to the node; and
the optimized graph data structure omits edges not required for the shortest paths.

20. The method of claim 15, wherein the determining and recording paths includes, for each path defined by the graph data structure, following the path within the executing application and adding application states reachable from an endpoint of the path to an application state list.

21. The method of claim 20, wherein the determining and recording paths includes, for each path defined by the graph data structure, adding application states reachable from intermediate states along the path to the application state list.

22. The method of claim 20, wherein the determining and recording paths includes, for each application state in the application state list, recording a series of user interface events used to reach the application state.

23. The method of claim 22, further comprising, for each application state in the application state list, reaching the application state by replaying the recorded series of user interface events to the executing application, wherein the text and metadata are extracted from the application state.

24. The method of claim 15, further comprising generating an updated graph data structure based on the graph data structure in response to real-time data from the executing application, wherein the determining and recording paths is performed based on the updated graph data structure.

25. The method of claim 24, wherein the generating the updated graph data structure includes, in response to a direct programming call being available to reach a first node of the nodes, creating a new edge directly from a head node of the nodes to the first node.

26. The method of claim 15, wherein the executing the application is performed within a first emulator.

27. The method of claim 26, wherein the extracting text and metadata is performed from within a second emulator executing the application.

28. A method of operating a mobile application search apparatus and improved searching of content in response to a query from a user device, the method comprising:
using static analysis, performed by at least one processor of the mobile application search apparatus, the static analysis identifying application state templates of the application, wherein the static analysis includes analyzing code of the application independent of executing the code;
using static analysis, performed by the at least one processor, identifying user interface elements that are configured to transition between states instantiated from different ones of the identified application state templates;
creating, using the at least one processor, a graph data structure including nodes and edges connecting the nodes, wherein the nodes correspond to the identified application state templates, and wherein the edges correspond to transitions between the identified application state templates corresponding to the identified user interface elements;
executing, using the at least one processor, the application;
determining and recording paths to application states within the executing application according to the graph data structure;
within an executing instance of the application, extracting, using the at least one processor, text and metadata from application states corresponding to endpoints of the recorded paths;
storing information based on the extracted text and metadata in a memory of the mobile application search apparatus;
in response to receiving a query from a user device, selecting records from the data store to form a consideration set of records;
assigning a score to each record of the consideration set of records; and
responding to the user device, using the at least one processor, with a subset of the consideration set of records to display results of the query on the user device, wherein the subset is selected based on the assigned scores.

29. A non-transitory computer-readable medium storing processor-executable instructions configured to perform the method of claim 15.

* * * * *